Figure 1:
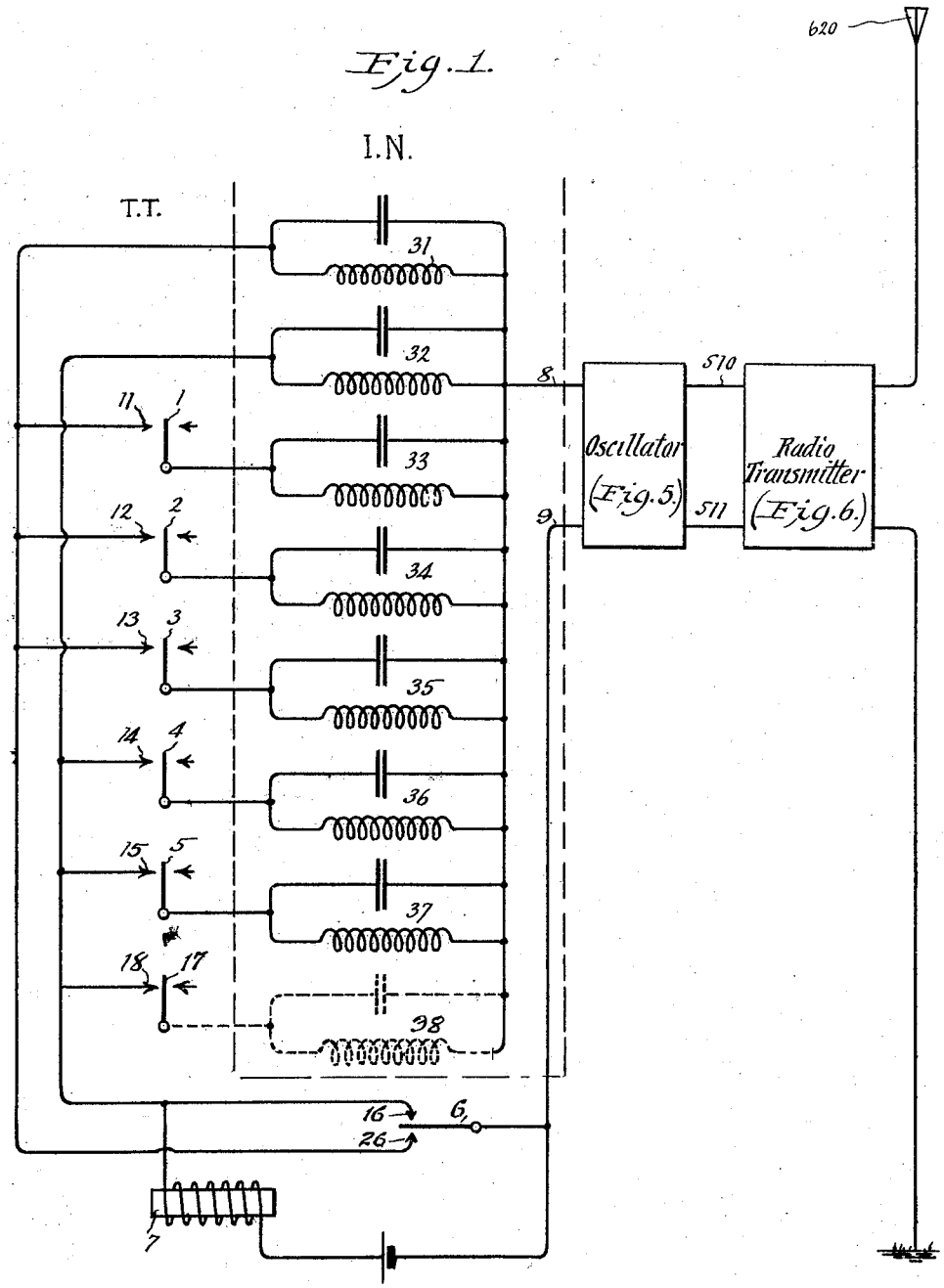

March 6, 1928.
N. A. ROBINSON
1,661,962
SIGNALING SYSTEM
Filed March 14, 1927 5 Sheets-Sheet 4
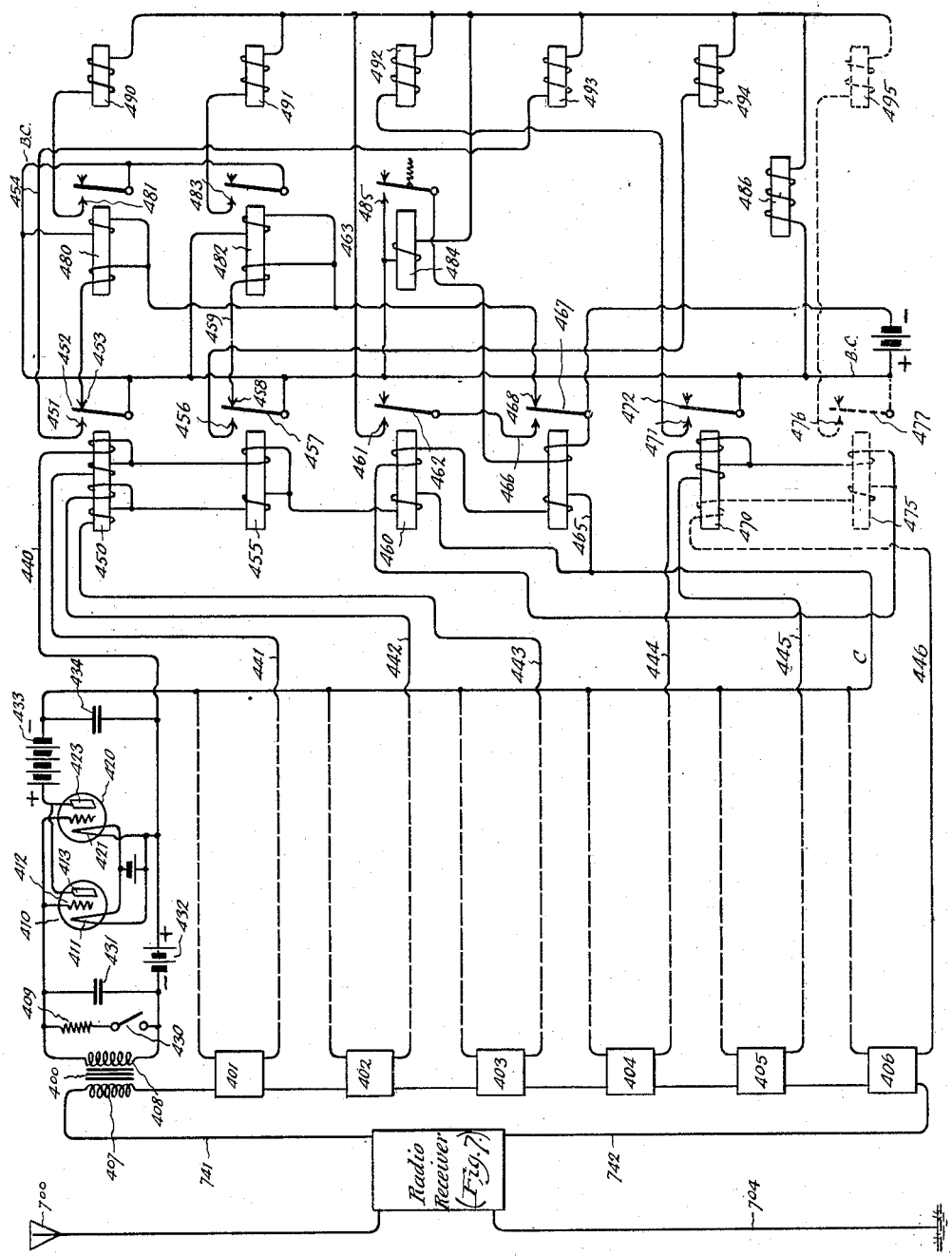
Fig. 4.
WITNESSES
Edw. Thorpe
Charles A. Morton
INVENTOR
Nils A. Robinson
BY 
ATTORNEYS March 6, 1928.
N. A. ROBINSON
SIGNALING SYSTEM
Filed March 14, 1927
1,661,962
5 Sheets-Sheet 5
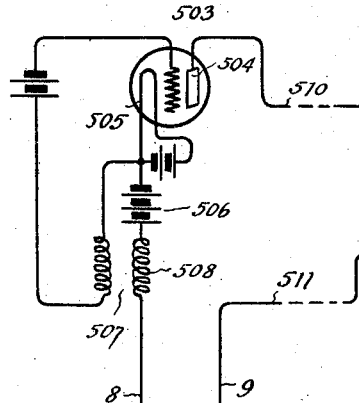
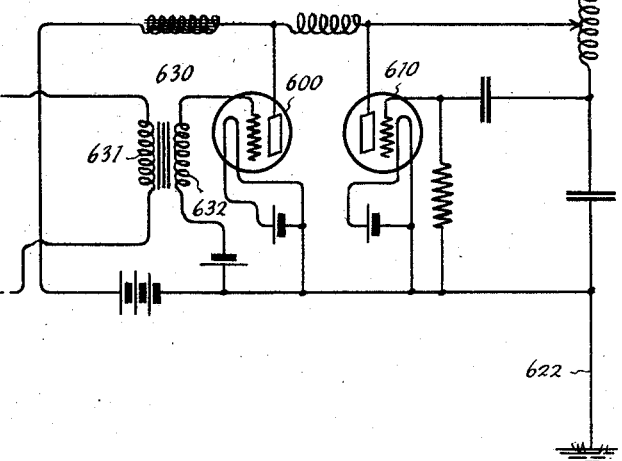
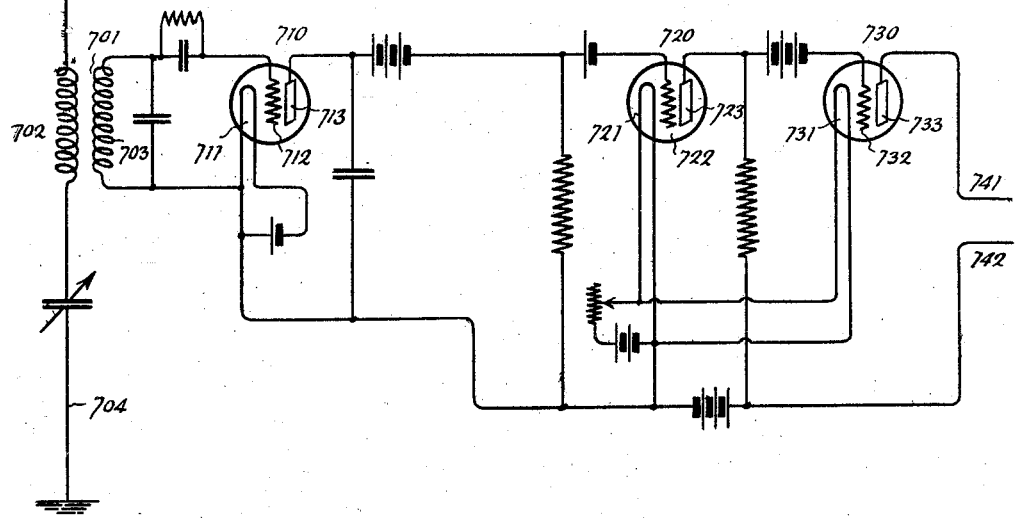
WITNESSES
INVENTOR
Nils A. Robinson
BY
ATTORNEYS Patented Mar. 6, 1928.

1,661,962

UNITED STATES PATENT OFFICE.

NILS A. ROBINSON, OF NEW YORK, N. Y.

SIGNALING SYSTEM.

Application filed March 14, 1927. Serial No. 175,313.

This invention relates to signaling systems, and more particularly to wireless telegraph systems, and is especially adapted for use in printing telegraph systems.

The object of this invention is an improved system of signaling with standard printing telegraph apparatus.

Another object is a system of wireless signaling in conjunction with the standard printing telegraph apparatus at present in use.

Another object is a system capable of operation at higher speed than the systems of the prior art.

Another object of the invention is simplicity of construction.

Another object is reliability in operation.

Another object is an inexpensive system.

In accordance with this invention means is provided for generating a plurality of alternating currents of different frequencies, these frequencies, preferably twelve in all, being used in various combinations in accordance with the particular combination of frequencies representing the particular character to be transmitted, means being likewise provided to translate each frequency combination into its components so as to indicate the particular character or symbol corresponding thereto.

In a signaling system of this character it is usual to employ 32 symbols or characters. This necessarily requires 32 different signaling combinations. In one form of my invention I obtain these 32 combinations by the employment of 12 distinct frequencies, divided into two groups, one group represented by the first impulse and comprising eight distinct frequencies, and the other group represented by the second impulse and comprising four distinct frequencies. I thus employ a total of twelve distinct frequencies in the operation of my system.

In the drawings comprising five sheets (Figures 1 to 7 inclusive) the invention is diagrammatically set forth as applied to a wireless signaling system.

Fig. 1 discloses the equipment at the transmitting station.

Figure 2:
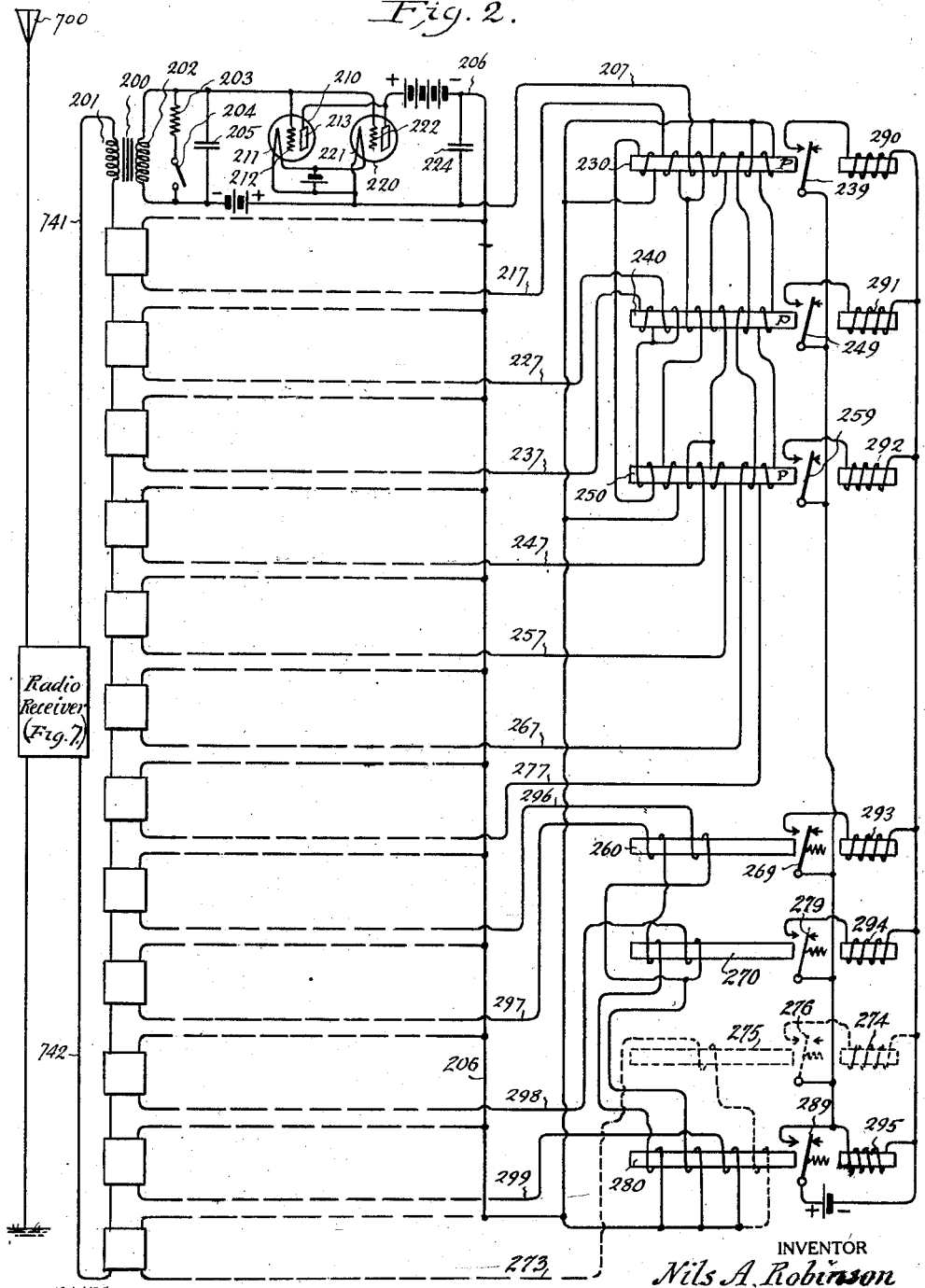

Fig. 2 discloses the equipment at the receiving station.

Figure 3:
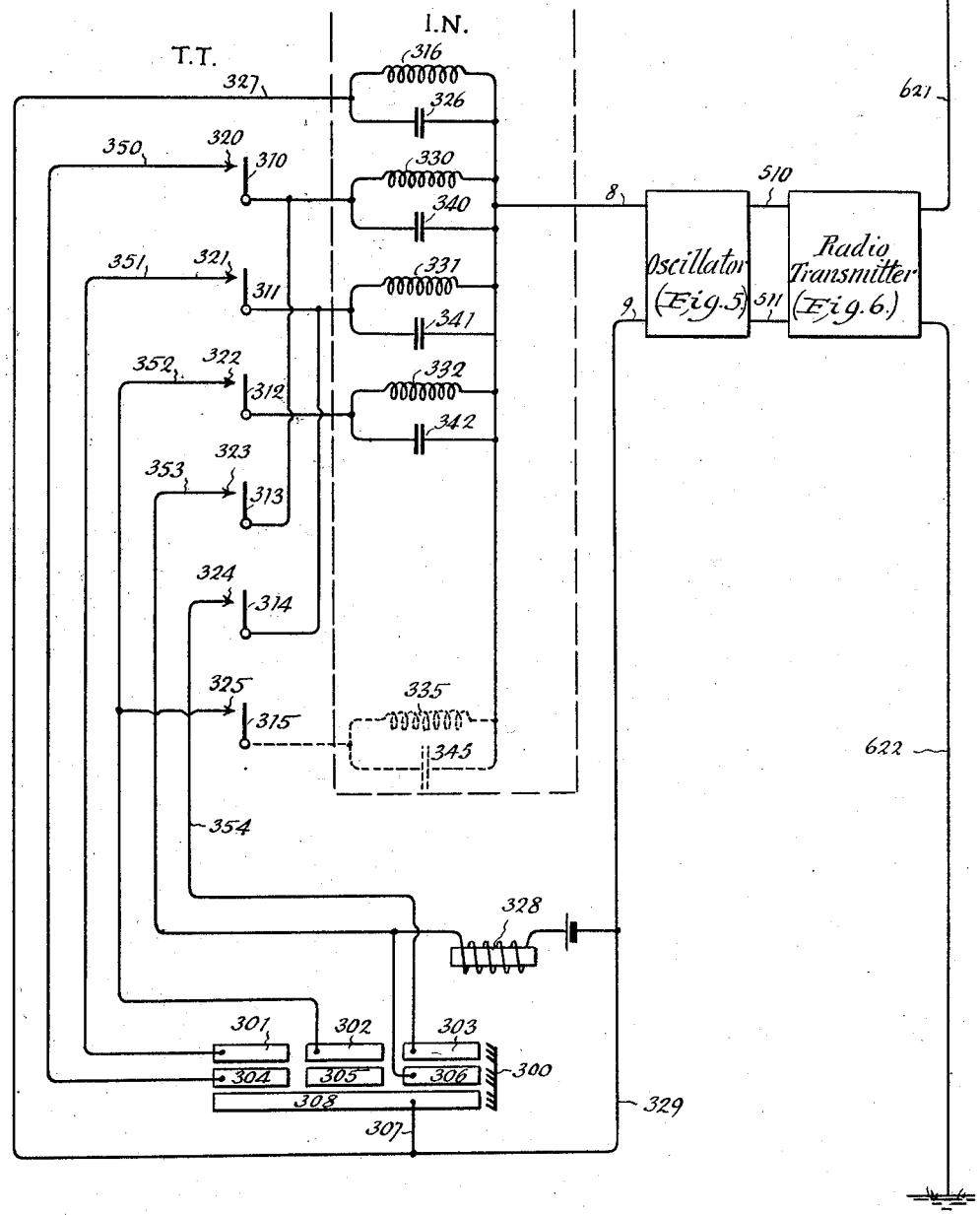

Fig. 3 discloses an alternative form of equipment used in a modification of the system of the transmitting station shown in Fig. 1.

Fig. 4 discloses a modified form of equipment to be used at a receiving station designed to operate in conjunction with the transmitting station disclosed in Fig. 3.

Fig. 5 discloses a suitable form of oscillator for use with Fig. 1 or 3.

Fig. 6 discloses a suitable form of radio transmitter for use with Fig. 1 or 3.

Fig. 7 discloses a suitable form of radio receiver for use with Fig. 2 or 4.

Certain elements of Figs. 1 to 4, inclusive, are shown dotted. These elements are used for the purpose of obtaining a greater number of signal combinations than thirty-two. It should be distinctly understood, however, that in the following description they are assumed not to be used unless specifically referred to.

Referring to Fig. 1, TT represents a tape transmitter machine or other device wherein the five contact members 1 to 5 are capable of simultaneously assuming one of two positions, which we will designate "left" or "right" against the corresponding left or right contact. Such a mechanism readily lends itself for use in connection with a five unit code. One form of tape transmitter machine suited to this purpose is described and illustrated in the publication entitled Printing Telegraph Systems and Mechanisms by H. H. Harrison, first edition printed by Longmans Green Co., London 1923.— See particularly Fig. 179 on page 179.

I. N. designates an impedance network capable of producing in conjunction with the oscillator any one of a series of twelve different frequencies dependent upon the particular contact member or members 1 to 5 which may be closed against the corresponding left contact to complete a network of a certain impedance.

It is, of course, obvious that the resulting impedance of the entire network I. N. in bridge with the oscillator at leads 8 and 9, will be dependent entirely upon the setting of the contact members 1 to 5 inclusive. The device 6 is an interrupter of any suitable form whose cycle of operations consists in alternately closing its lower contact 26 while opening its upper contact 16 and then opening its lower contact 26 while closing the upper contact 16.

The magnet 7 advances the tape after the completion of each cycle of operations of the interrupter 6.

The oscillator may be of any desired type so long as it is capable in conjunction with the impedance network I. N. of generating any one of the desired and predetermined group of frequencies. One suitable form of oscillator is described and disclosed in Principles of Radio Communication by J. H. Morecroft, first edition, published by John Wiley & Sons, New York 1921.—See particularly Figure 109 at page 488. The oscillator of Fig. 109 of Morecroft should be modified to conform to the circuit arrangement shown in Fig. 5 hereof.

The radio transmitter may be of any desired form. A suitable form of transmitter is shown in the publication entitled "The Thermionic Vacuum Tube and Its Applications" by H. J. Van der Bijl, first edition, published by McGraw Hill, New York 1920, particularly at page 324 Fig. 193 described on pages 323 and 324 thereof. The transmitter circuit of Van der Bijl if used is modified however to conform to the circuit arrangement shown in Fig. 6 of the drawings hereof.

The apparatus at the receiving station is illustrated in Fig. 2. The radio receiver represented by the rectangle may be of any desired form such for example as that shown in the publication The Thermionic Vacuum Tube and Its Applications by H. J. Van der Bijl heretofore referred to particularly at pages 332 to 335 inclusive, and especially Fig. 198 at page 332, and may include amplifiers, for instance of the type described on pages 253 and 254 of said publication. The circuits of Van der Bijl if used should be modified however to conform to the circuit arrangement shown in Fig. 7 of the drawings herein.

The system of Figs. 1 and 2 functions as follows: The transmitter tape, not shown, is carried forward step by step by mechanism, not shown, controlled by the magnet 7. As the tape transmitter machine forms no part of the present invention and is well known in the art it will not be described in detail. Any standard tape transmitter machine operating in accordance with the 5-unit code may be employed as the machine TT. The transmitter tape will be perforated to represent the particular symbol or character which it is desired to transmit and these perforations will be in alignment with a series of five reciprocating pins, not shown, the position of each pin controlling the position of each one of the contact members 1 to 5, inclusive, with reference to the particular one of contacts 11 to 15, inclusive, that is associated with it. Therefore, as the tape moves past the pins, one or more parallel circuits comprising the impedance network I. N. will be closed in order to prepare a circuit in accordance with the perforations in the tape. At the same time the interrupter 6 will commence its cycle of operations preparatory to transmitting the first pulse of the desired code and to that end a circuit will be completed to the oscillator across the leads 8 and 9 and including the interrupter 6 and its associated lower contact 26. The circuit thus established will complete a particular impedance network comprising network 31 and generally one or more of networks 33 to 35, inclusive.

Referring to Figs. 5 and 6, it will be observed that closing an impedance network in bridge across the leads 8 and 9 in the manner previously described will complete a circuit including the primary winding 631 of the transformer 630, plate 504 and filament 505 of the tube 503, battery 506, winding 508 of the transformer 507 back over the lead 8 to the impedance network I. N. (Fig. 1). In accordance with well known principles the frequency of the alternating current generated over this circuit will depend upon the effective resistance of the impedance network I. N. It will be understood that the various units 31 to 37 of the impedance network I. N. are so designed that the resulting frequency of the current generated in the oscillator will vary every time one or more of these units is introduced into or disconnected from the circuit by the opening or closing under control of the transmitter tape of any of the contact members 1 to 5 and their respective contacts 11 to 15. Each value of the effective resistance of the impedance network will result in the generation of an alternating current of a particular frequency. The frequency of every other current generated as a result of every other value of the effective resistance of the impedance network I. N. will be readily detectable and distinguishable one from another at the receiving station (Fig. 2).

Referring to Fig. 6 it will be observed that the tubes 600 and 610 and their associated apparatus and wiring are arranged to oscillate at a predetermined radio frequency so that an alternating current of a particular radio frequency will constantly emanate from the aerial 620. As the alternating current generated by the oscillator (Fig. 5) is superimposed upon the alternating current of radio frequency generated by the radio transmitter due to the inductive relation between the windings 631 and 632 of the transformer 630 the alternating current of radio frequency will be modulated by this alternating current superimposed from the oscillator circuit so that whenever a circuit for the impedance network I. N. is completed by way of the interrupter 6 and in general one or more of the contact members 1 to 5, inclusive, the alternating current of radio frequency will be modulated by the alternating current generated in the oscillator circuit (Fig. 5).

As has been previously stated each symbol or character transmitted by the tape transmitter TT requires two pulses. The first pulse having been transmitted by the radiation of the modulated radio frequency current from the aerial 620, we are now ready to obtain the setting for the second pulse and to transmit the same.

As previously indicated, the interrupter 6 may be of any preferred form. Frequently a tuning fork is used, although the form of interrupter is not important so long as it is reliable and travels at a substantially constant speed. The interrupter should be so designed that the member 6 will make contact with either 16 or 26 for relatively long periods of time, and so that the transfer period from one contact to the other will be a relatively short period of time. In order to transmit the second impulse it is necessary to break the circuit across the leads 8 and 9 at the interrupter contact 26 and to make contact between the interrupter 6 and its contact 16 to introduce a new and different impedance network in bridge across the leads 8 and 9. This network will comprise network 32 and generally one or both of networks 36 and 37. The change in the effective resistance of the impedance network results in the generation of an alternating current of a characteristically different frequency in the oscillator Fig. 5, and this in turn results in the characteristically different modulation of the alternating current of radio frequency emanating from the aerial 620.

Having transmitted both pulses corresponding to the specific character or symbol indicated by perforations in the transmitter tape we are now ready to advance the tape transmitter in order to transmit signals corresponding to the next symbol or character. At the time contact 16 of interrupter 6 was closed a local circuit was completed for the electro-magnet 7 and when the interrupter 6 having completed its cycle of operations commences a new cycle contact 16 is again opened at which time the electro-magnet 7 releases to advance the transmitter tape preparatory to sending pulses corresponding to the next character or symbol indicated by the punched tape.

It will, of course, be understood that the frequency of the alternating current generated by the oscillator Fig. 5 for each half cycle of the interrupter 6 will result in the generation of the different combination of frequencies of each character so that for the 32 possible characters employed 32 different possible combinations of frequencies will be available. That such will be the case will be obvious from a study of the arrangement of the tape transmitter. It will be observed that the contacts 11, 12 and 13 of the contact members 1, 2 and 3 are controlled by contact 26 of the interrupter 6, and as each of these contact members has two positions, namely, "open" or "closed" it is obvious that the contact members 1, 2 and 3 may be set to produce two times two times two, or eight different combinations. Similarly contacts 14 and 15 of contact members 4 and 5 are controlled by the contact 16 of the interrupter 6 during the sending of the second pulse of any particular character. These two contact members likewise have two positions, namely, "open" and "closed", as a result whereof it is possible to obtain two times two, or four different combinations during the transmission of the second pulse of the cycle. Each of the eight combinations of the first impulse of the cycle may, therefore, be combined with any one of the four, or thirty-two different possible combinations of impulses are available which may be utilized to transmit any one of thirty-two different characters or symbols.

The signal emanating from the aerial 620 at the transmitting station (see Figs. 1 and 6), is received in the aerial 700 at the receiving station (see Figs. 2 and 7). Referring to Fig. 7, the signal thus received in the aerial 700 flows through the primary winding 702 of the transformer 701 and a current of like characteristics is induced in the secondary winding 703 of the transformer. It is, of course, understood that this circuit is tuned to the radio frequency of the transmitting station (Fig. 1).

In accordance with well known principles the tube 710 functions as a detector to detect the audio frequency. As is obvious from a mere inspection of Fig. 7 the filament 711, grid 712 and plate 713 of tube 710 are wired in accordance with the usual arrangement for a vacuum tube detector and the audio frequency thus detected is conducted through two stages of amplification by means of tubes 720 and 730 and the associated wiring so that at leads 741 and 742 the audio frequency has been amplified many fold.

Referring to Fig. 2 it will be observed that the audio frequency thus amplified passes through the primary windings of a series of a group of twelve transformers which are connected in series. Only one of these transformers to wit: transformer 200 is shown in detail, it being understood that the other eleven transformers which are merely indicated by eleven squares are similar in all respects to transformer 200.

The current of audio frequency flowing in the primary winding 201 results in the generation by induction of a current of similar characteristics in the secondary winding 202 of transformer 200. The vacuum tubes 210 and 220 which are connected in tandem form part of a system including the condenser 205 and (when switch 204 is closed) the resistance 203, which is tuned to one of the twelve audio frequencies which are employed in the transmitting station at Fig. 1 to modulate the radio frequency in the aerial circuit of the transmitting station. This tuned system including vacuum tubes 210 and 220 performs the functions of a rectifier thereby rectifying the audio frequency preparatory to the utilization thereof for actuating the relays 230, 240 or 250.

The relays 230, 240 and 250 (Fig. 2) are polarized and are "stay-put" relays, that is, they are so designed that their respective armatures 239, 249 and 259 will remain in either the up or down position dependent upon the direction of the magnetic field generated by the last current flowing through the winding or windings of the polarized relay or relays.

Relays 260, 270 and 280 may or may not be polarized, but these relays, as is indicated in Fig. 2 of the drawings, are all biased in such a manner that in the normal position of these relays their respective armatures 269, 279 and 289 rest upon their respective back contacts. The magnets 290 to 295 inclusive are the printer magnets which are utilized to record or indicate either audibly or visibly as desired, the symbol or character corresponding to the signal received at the receiving station which, in turn, corresponds to the symbol or character transmitted by the transmitting station, Fig. 1.

Each of the relays 230, 240 and 250 is provided with six windings. These windings reading from the left will be referred to as windings 1, 2, 3, 4, 5 and 6 respectively. To avoid the unnecessary multiplication of characters on the drawings, individual reference numerals have not been applied to each of these windings.

Relays 260 and 270 are provided with two windings which reading from left to right will be referred to as windings 1 and 2. Relay 280 is provided with three windings which reading from left to right will be referred to as windings 1, 2 and 3 respectively.

Relays 230, 240 and 250 are utilized for the purpose of recording the first pulse of any character or symbol transmitted at the transmitting station Fig. 2 under control of the interrupter 6. Relays 260, 270 and 280 are utilized for recording the signal transmitted in accordance with the second pulse of any particular character or symbol. It will be observed that the various windings of relays 230, 240 and 250 are connected by means of the leads 207, 217, 227, 237, 247, 257, 267 and 277 to the tuned systems associated with the first eight transformers in the group of twelve transformers indicated by the transformer 200 and the series of eleven squares at the left of Fig. 2. It will also be observed that the windings of the relays 260, 270 and 280 are connected by means of the leads 296, 297, 298 and 299 to the tuned systems associated with the remaining four transformers of Fig. 2. Obviously, therefore, any one of the group of twelve predetermined frequencies emanating from the aerial 620 of Figs. 1 and 6 will be detected and amplified in the radio receiver (Fig. 7) and conveyed thence by a lead 741 and 742 to the group of twelve transformers in series. The one of the twelve rectifier circuits which is tuned to that specific frequency will thereupon function to rectify the same and convey the rectified current via one of the leads 207, 217, 227, 237, 247, 257, 267, or 277, if the current represents the first half cycle of the interrupter 6 (Fig. 1) or via one of the leads 296, 297, 298 or 299 if the current represents the frequency generated during the second half cycle of the interrupter 6 (Fig. 1), to the proper group of relays, which, as heretofore indicated, will be either the upper group, if the current represents the frequency generated during the first half cycle, or the lower group if the current represents the frequency generated during the second half cycle of the interrupter 6, said current flowing back to the rectifier circuit by way of the common lead 206. Dependent upon the directions of those of their windings traversed by the current, the various relays will assume various settings corresponding to the particular character or symbol represented by the signal current.

The following is a typical code which might be used at the transmitting station, Fig. 1, and the receiving station, Fig. 2, for the purpose of transmitting and receiving the various frequencies. It will of course be understood that the manner of combining any one of the first eight frequencies designated 1 to 8, with any one of the four last frequencies, designated 9 to 12, to produce a particular character or symbol is not material to this code.

| Frequency | Transmitter tape | | | Relay setting | | |
|---|---|---|---|---|---|---|
| | 1 | 2 | 3 | 230 | 240 | 250 |
| 1 | O | O | O | D | D | U |
| 2 | C | O | C | U | D | D |
| 3 | C | C | O | U | U | D |
| 4 | O | C | C | D | U | U |
| 5 | C | O | C | U | D | U |
| 6 | O | C | O | D | U | D |
| 7 | C | C | C | U | U | U |
| 8 | O | O | O | D | D | D |
| | 4 | 5 | | 260 | 270 | |
| 9 | C | O | | U | D | |
| 10 | C | C | | U | U | |
| 11 | O | C | | D | U | |
| 12 | O | O | | D | D | |

The symbols C and O applied in the tabulations of the transmitter tape are intended to indicate "closed" or "open", respectively, with respect to the five contact members 1 to 5, inclusive, and the symbols U and D applied to the column relay setting, are intended to indicate the operated position and the down, or released position of the relays 230, 240, 250, 260 and 270, respectively. It is assumed that the tuned circuits associated with leads 207, 217, 227, 237, 247, 257, 267, 277, 296, 297, 298, 299, individually respond to the frequencies designated 1, 2, 3, ... 12, respectively, in the above code.

It is obvious that as soon as the second impulse is being received, relays 230, 240, 250, 260, 270 will have assumed settings identical with the positions of the transmitter contacts of Fig. 1, and corresponding therefore to the perforations of the transmitter tape. As soon as relay 280 operates, these settings will be transferred to the selecting or recording magnets 290 to 294, inclusive. Relay 280 is not necessarily slow acting but is designed to be slower to operate than relays 260 and 270. The relative slowness of 280 is desirable in order to permit relays 260 and 270, if operated, to close their respective armatures and front contacts to complete circuits for their respective recorder magnets 293 and 294 before relay 280 has an opportunity to operate and complete the circuit via its armature 289 and front contact, for the magnet 295. The function of magnet 295 is to start the recording or printing of a character at the receiving station.

It will be understood that magnets 290 to 294, together with magnet 295, are a part of the recording device and that their sole function is to control in said recording device, the utilization of the received five-unit signal combination for printing of a letter, or for giving visible or audible indication, or for performing any other selective operation that may be desired.

It should be understood that the number of symbols which the system disclosed in Figs. 1 and 2 is capable of transmitting may be increased by adding an additional set of contacts in the tape transmitter machine T—T (Fig. 1) so as to employ a six-unit instead of a five-unit code. To effect this modification, the elements shown dotted in Figs. 1 and 2 are added. Another circuit, 38 (Fig. 1), comprising inductance and capacity, is added to the impedance network I. N. to operate in conjunction with the extra contact. By connecting this additional circuit across contact 16 and lead 8 as shown, and by adopting a six-unit code which has the sixth element operated only for eight combinations, these eight combinations having their fourth and fifth elements not operated, it is obviously possible to transmit eight times five or forty combinations by the use of eight plus five or thirteen frequencies. It will, of course, be understood that this modification will necessitate a change in the receiving arrangement, as shown in Fig. 2, to include another tuned circuit, associated with lead 273, another winding on relay 280, another relay 275 of the type of relays 260 and 270 but with one winding, and another recording magnet 274 of the type of magnets 290 to 294, inclusive.

The following code might be used with the above arrangement.

| Frequency | Transmitter tape | | | Relay setting | | |
|---|---|---|---|---|---|---|
| | 1 | 2 | 3 | 230 | 240 | 250 |
| 1 | O | O | C | D | D | U |
| 2 | C | O | C | U | D | D |
| 3 | C | C | O | U | U | D |
| 4 | O | C | C | D | U | U |
| 5 | C | O | C | U | D | U |
| 6 | O | C | O | D | U | D |
| 7 | C | C | C | U | U | U |
| 8 | O | O | O | D | D | D |
| | 4 | 5 | 17 | 260 | 270 | 275 |
| 9 | C | O | O | U | D | D |
| 10 | O | C | O | D | U | D |
| 11 | O | C | O | D | U | D |
| 12 | O | O | O | D | D | D |
| 13 | O | O | C | D | D | U |

The symbols C and O refer, of course, to the respective "closed" and "open" positions of the six transmitter contacts 1, 2, 3, 4, 5 and 17, while the symbols U and D signify the "up" and "down" positions, respectively, of the various relay armatures.

Figures 3 and 4 of the drawings disclose an alternative system for that disclosed in Figs. 1 and 2, heretofore described.

The oscillator (Fig. 5) may be used at the point designated "oscillator" in Fig. 3, and the radio transmitter (Fig. 6) may be used in conjunction with the oscillator (Fig. 5) at the point designated "radio transmitter" in Fig. 3.

The radio receiver (Fig. 7) may be used in conjunction with the receiving system disclosed in Fig. 4 at the point designated "radio receiver".

Whereas the system disclosed in Figs. 1 and 2 constitutes a system having two impulses per cycle, that is, two impulses for each letter or symbol transmitted, the system disclosed in Figs. 3 and 4 is a three impulse per cycle system, that is, a system wherein each character or symbol is transmitted by a signal combination comprising three separate successively transmitted impulses.

In the system disclosed in Figs. 3 and 4, and referring more specifically to Fig. 3, the tape transmitter machine is indicated at T—T and the impedance network at I. N.

The interrupter for completing the circuits for initiating the transmission of the impulses is indicated at 300 to 308, inclusive. It consists, in the form shown, of a commutator or interrupter drum comprising a feed bar or slip ring 308 and a series of segments 301 to 306, inclusive.

The brush 300 is adapted to bridge the segments of the commutator to the feed bar or slip ring, thereby momentarily closing the feed bar or slip ring 308 to the pairs of segments 301, 304; 302, 305; and 303, 306; in succession.

The commutator and feed bar 308 in the preferred form constitutes a drum or interrupter rotating at suitable speed under control of an electric motor or some other source of driving power. It will be observed that the segments 301 to 306, inclusive, are relatively long as compared with the insulation between the various pairs of segments, 301, 304; 302, 305; and 303, 306. As a result, the period of closure from the feed bar or slip ring 308 via the brush 300 to the various pairs of segments will be relatively long as compared with the open circuit period, which will be relatively short.

The general principle of operation of the system set forth in Figs. 3 and 4 is similar to that of the system set forth in Figs. 1 and 2. It should be understood, however, that with the system of Figs. 3 and 4, it is possible to obtain thirty-two combinations when five sets of contacts (310 to 314, inclusive) are used, and forty-eight combinations when six sets of contacts (310 to 315 inclusive) are used. The circuit wiring indicated in dotted lines in Figs. 3 and 4 is only used when the system is designed for forty-eight combinations of impulses, that is, for transmitting forty-eight characters or symbols.

In the system of Figs. 3 and 4, only six frequencies are ordinarily used. When the sixth set of contacts 315, 325 are used, the number of frequencies is increased to seven. It is, therefore, obvious that the system of Figs. 3 and 4 reduces the number of frequencies employed but increases the number of impulses per cycle. It will be understood, therefore, that due to the increase in the number of impulses per cycle from two to three, the system of Figs. 3 and 4 will be somewhat slower in operation than the system of Figs. 1 and 2. At the commencement of the cycle, that is, when the first impulse of a signal combination corresponding to a character is about to be transmitted, the brush 300 will be in a position to connect segments 301 and 304 of the commutator to the feed bar or slip ring 308. During the transmission of the second impulse of the cycle, the brush 300 will be in a position to connect segment 302 of the commutator to the feed bar or slip ring 308. Similarly, when the final or third impulse of the cycle is transmitted, the brush 300 will bridge the feed bar or slip ring 308 to segments 303 and 306. It thus appears that if the commutator is in the form of an interrupter drum, said drum must rotate in a clockwise direction, while if it is in the form of a flat commutator provided with a moving brush, the brush must move from left to right.

It will be understood that dependent upon the punchings in the transmitter tape, the mechanism controlling the contact members 310 to 315, inclusive, and their associated forward contacts 320 to 325, inclusive, will cause one or more, or none, of these contact members and their associated forward contacts to be closed, thus varying the impedance of the impedance network I. N. connected in bridge across the conductors 8 and 9 of the oscillator (Fig. 5). For each successive impulse of the cycle as controlled by the position of the segments 301 to 306 with respect to brush 300, the impedance of the network I. N. will assume a different value in accordance with the setting of the contact members and their associated contacts. As a result of this operation, there will be a combination of three successive impulses per cycle, which will cause the generation in the oscillator of three successive frequencies. The frequencies will modulate the radio wave emanating from aerial 620 as heretofore described.

The receiving aerial 700 (Fig. 4) will pick up this modulated radio wave and the same will be detected and its characteristic frequency amplified in the radio receiver (Fig. 7). This frequency will be impressed on the primary windings, in series, of transformers 400 to 406, inclusive, by way of leads 741 and 742. It will be understood that the secondary winding 408 of the transformer 400 and the secondary windings of each of the transformers 401 to 406, inclusive, are each individually connected to a tuned circuit comprising a rectifier, the arrangement indicated in conjunction with the transformer 400 being typical. As each of these tuned circuits is substantially responsive to but one particular frequency, and as the transmitting arrangement heretofore described is only capable of transmitting one frequency at a time, it will be seen that at any given time only one of said tuned circuits will operate.

Referring to Fig. 4, relays 450, 455, 460, 465, 470, 475, 480 and 482, are polarized but are not biased. Relay 484 may or may not be polarized but this relay is biased so that in its normal position the armature of relay 484 rests against the back contact of the relay.

Relays 480 and 482 are differentially wound. These relays are so designed that when both windings, of either of these relays, are closed over parallel circuits, the left hand winding overcomes the right hand winding.

The system of Figs. 3 and 4 is capable of operation with a five-unit code or with a six-unit code. The former case will be considered first, i. e., in the description immediately following, all dotted elements of Figs. 3 and 4 will be disregarded.

When the tape transmitter T—T (Fig. 3) is ready to transmit the first impulse of the cycle, the impedance network I. N. will be closed via 8, 316, and 326 in parallel, 327, and 329 to 9. This impedance may be modified by way of a parallel path through 310, 320; or 311, 321; or both; and 301 or 304, or both, to 307; 329 to lead 9. One of four frequencies will be transmitted from the aerial 620. One of the rectifier circuits connected to the secondary of one of the transformers 400 to 403, inclusive (Fig. 4) is tuned to respond to the frequency transmitted. Relays 450, 455 and 460 will now assume a setting dependent upon the frequency transmitter so that armatures 452, 457 will rest either against their front contacts 451, 456, or against their back contacts 453, 458. Relay armature 462 will move up against its front contact 461.

That this will be the case for all four frequencies is evident from the fact that the left-hand winding of relay 460 is included in all four circuits. The directions of the windings are assumed to be such as to cause armature 462 to move as described.

Relays 480 and 482 will assume the same setting as relays 450 and 455 in the following manner. Relay 480 operates as follows: from battery, lead B C, right hand winding 480, back contact 468 and armature 467 to battery. If relay 450 is not operated, however, there is a circuit through the left-hand winding of relay 480 as follows: battery, lead B C, 452, 453, left hand winding relay 480, back contact 468 and armature 467 to battery. Owing to the differential condition through its windings in parallel relay 480 will not operate at this time, but its armature will be forced against its back contact. It is obvious, however, that whenever relay 450 operates thereby removing the differential condition relay 480 will operate through its right hand winding over the local circuit traced, causing its armature to move up against its front contact 481. Relay 482 functions similarly to relay 480 over circuits through its windings in parallel, the left hand winding of relay 482 being controlled by relay 455.

During the second impulse of the cycle, brush 300 (Fig. 3) bridges 308 to 302. It is evident that the transmitted frequency is under control of contacts 312, 322. One of two frequencies will be transmitted. To this frequency a tuned circuit connected to transformer 404 or 405, also relays 470, 460 and 465 (Fig. 4) respond to assume a setting for the second impulse. More particularly, 470 may or may not operate, armature 460 of 462 will release, pressing against its back contact, and relay 465 will operate. The operation of relay 465 opens all circuits through the windings of relays 480 and 482 at its armature 467 and back contact 468. Relays 480 and 482 being polarized do not change their former setting.

During the third and final impulse, the impedance of the network I. N. (Fig. 3) is controlled by the contact members 313, 323; and 314, 324; brush 300, segments 303 and 306, and slip ring or feed bar 308. One of four frequencies will be transmitted. It is evident that the four frequencies that are applicable to the third impulse are the same that were available for the first impulse.

At the same time the magnet 328 controlling the advance of the transmitter tape is energized via 306. When this magnet releases upon the opening of the circuit formerly closed by way of segment 306 the tape is advanced to the next position in the tape transmitter machine T—T.

Relays 450 and 455 again assume a setting and relay 460 operates during the third impulse. The proper printer magnets will now be energized in the following manner. The operation of relays 460 and 465 connected negative battery to lead 463, thence to the windings of all the magnets 490 and 494, inclusive. If the armature of relay 480 is closed at its front contact, 490 is energized over battery common lead B. C. If the armature of relay 482 is closed at its front contact, 491 is energized over lead B. C. If relay 470 operated during the second impulse, magnet 492 is energized via 471 and 472. If relay 450 operated upon the third impulse, 493 is energized via 451 and 453. Similarly, if relay 455 operated upon the third impulse, magnet 494 is energized via 456 and 457.

It is obvious that if a suitable code be adopted the printer magnets will assume settings corresponding exactly to the positions of the contact members of the tape transmitter of Fig. 3. Such a code is shown below:

| Frequency. | Transmitter tape (Fig. 3). | | Relay setting (Fig. 4). | | Impulse transmitted. |
|---|---|---|---|---|---|
| | 310 | 311 | 450 | 455 | |
| 1 | O | O | D | D | First. |
| 2 | C | O | U | D | First. |
| 3 | O | C | D | U | First. |
| 4 | C | C | U | U | First. |
| | 312 | | 470 | | |
| 5 | O | | D | | Second. |
| 6 | C | | U | | Second. |
| | 313 | 314 | 450 | 455 | |
| 1 | O | O | D | D | Third. |
| 2 | C | O | U | D | Third. |
| 3 | O | C | D | U | Third. |
| 4 | C | C | U | U | Third. |

Symbols C and O applied in the column "transmitter tape" indicate "closed" and "open" respectively with respect to the five contact members 310 to 315 inclusive. The symbols U and D applied in the column "relay setting" are intended to indicate the operated position and the down, released or normal position of the relays 450, 455, and 470 respectively. The particular impulse of the cycle (that is "first", "second" or "third") is indicated in the column "impulse transmitted".

The operation of relays 460 and 465 likewise completes a circuit to energize magnet 486. This magnet advances the recording mechanism to start the printing cycle.

A circuit is also closed for relay 484 which operates closing its armature and front contact to complete a circuit to actuate relay 465 as follows: positive battery, lead B. C., 485, right hand winding 465 to negative battery. Relay 465 now transfers its armature 467 from its front contact 466 to to its back contact 467 and the apparatus is now ready for the first impulse of the next cycle.

With a six-unit code, i. e., using the dotted elements of Figs. 3 and 4, the operation for the first and third impulses is identical with that described above. For the second impulse, the apparatus functions as follows:

The transmitted frequency is under control of contacts 312—322, and 315—325 (Fig. 3). Assume the code to be so arranged that for sixteen combinations the contact 315 is closed and the contact 312 is open. The contact 315 is, of course, open for thirty-two combinations, during sixteen of which the contact 312 is closed, and during the remaining sixteen combinations of the thirty-two it is open. This arrangement obviously gives one of three frequencies for the second impulse.

At the receiver (Fig. 3), the received frequency will operate one of the tuned circuits connected to transformer 406, 405, or 404, respectively. By an examination of the direction of the windings of relays 470 and 475, it will be found that the respective armatures of these relays will in all three cases reproduce the settings of transmitter contacts 312 and 315 (Fig. 3), discussed in the preceding paragraph.

The setting of armature 477 of relay 475 will, of course, be transferred to recording magnet 495 during the third impulse.

The following is a suitable code for the arrangement just described.

| Frequency. | Transmitter tape (Fig. 3). | | Relay setting (Fig. 4). | | Impulse transmitted. |
|---|---|---|---|---|---|
| | 310 | 311 | 450 | 455 | |
| 1 | O | O | D | D | First. |
| 2 | C | O | U | D | First. |
| 3 | O | C | D | U | First. |
| 4 | C | C | U | U | First. |
| | 312 | 315 | 470 | 475 | |
| 5 | O | O | D | D | Second. |
| 6 | C | O | U | D | Second. |
| 7 | O | C | D | U | Second. |
| | 313 | 314 | 450 | 455 | |
| 1 | O | O | D | D | Third. |
| 2 | C | O | U | D | Third. |
| 3 | O | C | D | U | Third. |
| 4 | C | C | U | U | Third. |

The symbols C, O, U, D, refer, as usual, to the respective "closed", "open", "up" and "down" positions of the transmitter contacts and relay armatures.

What is claimed is:

1. In a signaling system for transmitting characters in accordance with a prearranged code, means for recording the characters in succession in codified form, a timing device comprising an interrupter, a circuit including said timing device and a plurality of impedances constituting a network of variable impedance for generating alternating current impulses, the frequency of each impulse varying with each variation in impedance of the network and the duration of each impulse being measured by the timing device, the variations in impedance of the network being in turn controlled by the record code, and a channel into which the impulses are directed 2. In a signaling system for transmitting characters in accordance with a prearranged code, a standard tape transmitter machine for recording the characters in succession in codified form, a timing device comprising an interrupter, a circuit including said timing device and a plurality of impedances constituting a network of variable impedance for generating alternating current impulses, the frequency of each impulse varying with each variation in impedance of the network and the duration of each impulse being measured by the timing device, the variations in impedance of the network being in turn controlled by the recorded code, and a channel into which the impulses are directed.

3. In a signaling system for transmitting characters in accordance with a five unit code, means for recording the characters in succession in the form of a five unit code, a timing device comprising an interrupter, a circuit including said timing device and a plurality of impedances constituting a network of variable impedance for generating alternating current impulses, the frequency of each impulse varying with each variation in impedance of the network and the duration of each impulse being measured by the timing device, the variations in impedance of the network being in turn controlled by the recorded code, and a channel into which the impulses are directed.

4. In a signaling system for transmitting characters in accordance with a prearranged code, means for recording the characters in succession in codified form, a timing device comprising an interrupter, a circuit including said timing device and a plurality of impedances constituting a network of variable impedance for generating alternating current impulses, the frequency of each impulse varying with each variation in impedance of the net work and the duration of each impulse being measured by the timing device, the variations in impedance of the network being in turn controlled by the recorded code, a receiving station, and a channel leading to the receiving station into which the impulses are directed.

5. In a signaling system for transmitting characters in accordance with a prearranged code, a standard tape transmitter machine for recording the characters in succession in codified form, a timing device comprising an interrupter, a circuit including said timing device and a plurality of impedances constituting a network of variable impedance for generating alternating current impulses, the frequency of each impulse varying with each variation in impedance of the network and the duration of each impulse being measured by the timing device, the variations in impedance of the network being in turn controlled by the recorded code, a receiving station, and a channel leading to the receiving station into which the impulses are directed.

6. In a signaling system for transmitting characters in accordance with a five unit code, means for recording the characters in succession in the form of a five unit code, a timing device comprising an interrupter, a circuit including said timing device and a plurality of impedances constituting a network of variable impedance for generating alternating current impulses, the frequency of each impulse varying with each variation in impedance of the network and the duration of each impulse being measured by the timing device, the variations in impedance of the network being in turn controlled by the recorded code, a receiving station and a channel leading to the receiving station into which the impulses are directed.

7. In a signaling system a sending station for transmitting characters in accordance with a prearranged code comprising means for recording the characters in succession in codified form, a timing device comprising an interrupter, a circuit including said timing device and a plurality of impedances constituting a network of variable impedance for generating alternating current impulses, the frequency of each impulse varying with each variation in impedance of the network and the duration of each impulse being measured by the timing device, the variations in impedance of the network being in turn controlled by the recorded code, a receiving station, a channel between the sending and the receiving stations into which the impulses are directed, means at the receiving station selectively responsive to each impulse, a register translator whose setting is controlled by the impulse responsive means, and means controlled by the register translator for recording the character represented by the setting of the register translator.

8. In a signaling system a sending station for transmitting characters in accordance with a prearranged code comprising a standard tape transmitter machine for recording the characters in succession in codified form, a timing device comprising an interrupter, a circuit including said timing device and a plurality of impedances constituting a network of variable impedance for generating alternating current impulses, the frequency of each impulse varying with each variation of the impedance in the network and the duration of each impulse being measured by the timing device, the variations in impedance of the network being in turn controlled by the recorded code, a receiving station, a channel between the sending and receiving stations into which the impulses are directed, means at the receiving station selectively responsive to each impulse, a register translator whose setting is controlled by the impulse responsive means, and means controlled by the register translator for recording the character represented by the setting of the register translator.

9. In a signaling system a sending station for transmitting characters in accordance with a five unit code, means for recording the characters in succession in the form of a five unit code, a timing device comprising an interrupter, a circuit including said timing device and a plurality of impedances constituting a network of variable impedance for generating alternating current impulses, the frequency of each impulse varying with each variation in impedance of the network and the duration of each impulse being measured by the timing device, the variations in impedance of the network being in turn controlled by the recorded code, a receiving station, a channel between the sending and receiving stations into which the impulses are directed, means at the receiving station selectively responsive to each impulse, a register translator whose setting is controlled by the impulse responsive means, and means controlled by the register translator for recording the character represented by the setting of the register translator.

NILS A. ROBINSON.